US008824771B2

(12) United States Patent
Klein

(10) Patent No.: US 8,824,771 B2
(45) Date of Patent: Sep. 2, 2014

(54) METHOD AND DEVICE FOR TRACING BANK NOTES

(75) Inventor: Werner Klein, Salzkotten (DE)

(73) Assignee: Wincor Nixdorf International GmbH (DE)

( * ) Notice: Subject to any disclaimer, the term of this patent is extended or adjusted under 35 U.S.C. 154(b) by 30 days.

(21) Appl. No.: 13/509,643

(22) PCT Filed: Oct. 22, 2010

(86) PCT No.: PCT/EP2010/006470
§ 371 (c)(1),
(2), (4) Date: May 14, 2012

(87) PCT Pub. No.: WO2011/072767
PCT Pub. Date: Jun. 23, 2011

(65) Prior Publication Data

US 2013/0108142 A1 May 2, 2013

(30) Foreign Application Priority Data

Dec. 14, 2009 (DE) ........................ 10 2009 044 881

(51) Int. Cl.
*G06K 9/00* (2006.01)

(52) U.S. Cl.
USPC .......................................................... 382/135

(58) Field of Classification Search
None
See application file for complete search history.

(56) References Cited

U.S. PATENT DOCUMENTS 5,692,068 A * 11/1997 Bryenton et al. ............ 382/135
6,783,061 B2 8/2004 Graef et al.
2003/0168849 A1 9/2003 Reinisch
2004/0028266 A1 * 2/2004 Jones et al. .................. 382/135
2004/0154964 A1 8/2004 Jones
2006/0100893 A1 * 5/2006 Cunningham et al. ........... 705/1
2009/0242627 A1 10/2009 Reinisch et al.
2011/0125641 A1 * 5/2011 Kagehiro et al. .............. 705/43
2012/0150745 A1 * 6/2012 Csulits et al. .................. 705/45

FOREIGN PATENT DOCUMENTS

| | | | |
|---|---|---|---|
| DE | 10029051 | A1 | 12/2001 |
| EP | 1467327 | A2 | 10/2004 |
| EP | 1489562 | B1 | 10/2006 |
| EP | 1901247 | A1 | 3/2008 |
| WO | WO-2005017842 | A1 | 2/2005 |
| WO | WO-2006040117 | A1 | 4/2006 |

OTHER PUBLICATIONS

International Search Report in German (with English Translation) for PCT/EP2010/006470, mailed Feb. 17, 2011; ISA/EP.

* cited by examiner

*Primary Examiner* — Nirav G Patel
(74) *Attorney, Agent, or Firm* — Harness, Dickey & Pierce, P.L.C.

(57) ABSTRACT

The invention relates to a method for tracing bank notes, wherein bank notes are inserted into an automated teller machine having a deposit function and are checked for authenticity, wherein a serial number of the bank note is detected and is stored as text together with transaction data. In addition, a serial number image of the bank notes is detected which forms an image detail of the bank note in an area of the bank note intended for the serial number, the detected serial number image with the serial number and the transaction data are stored and the serial number images are compared with the forged bank note if the serial number of the forged bank note has not been completely identified and/or if a comparison of the serial number of the forged bank note does not produce an agreement with the at least one stored serial number.

17 Claims, 3 Drawing Sheets

METHOD AND DEVICE FOR TRACING BANK NOTES

CROSS-REFERENCE TO RELATED APPLICATIONS

This application is a National Stage of International Application No. PCT/EP2010/006470, filed Oct. 22, 2010, and published in German as WO/2011/072767 A1 on Jun. 23, 2011. This application claims the benefit and priority of German Application 10 2009 044 881.0, filed Dec. 14, 2009. The entire disclosures of the above applications are incorporated herein by reference.

BACKGROUND

This section provides background information related to the present disclosure which is not necessarily prior art.

TECHNICAL FIELD

The invention relates to a method for tracing bank notes, wherein bank notes are inserted into an automated teller machine having a deposit function and checked for authenticity, and wherein a serial number for the bank note is detected and stored as text together with transaction data.

DISCUSSION

The invention further relates to a device for tracing bank notes, using a deposit device by means of which bank notes can be inserted into the automated teller machine, with a bank note checking device by means of which the inserted bank notes can be checked for authenticity, having an optical character recognition device by means of which a serial number of the bank note can be generated as text from image data of said bank note, and having a control unit with a bank note checking program by means of which, first, the serial number of the respective bank notes can be stored in a data memory by assigning said serial number to transaction data of the same bank note, and by means of which, second, the serial number of a bank note detected as forged can be checked for agreement with the serial numbers stored as text in the data memory.

The invention further relates to a computer program product.

A device is known from EP 1 489 562 B1 for tracing bank notes that makes it possible to identify a depositor who has deposited a forged bank note at any automated teller machine. The device has a bank note checking device and a scanning device so that, first, the authenticity of the deposited bank notes can be examined and, second, at least if the bank note is forged, a corresponding image of said note is generated that is stored in a data memory along with the transaction data of the deposit. If the existence of the forged note is confirmed by checking said note, for example at an external inspection location (central state bank, Federal Bank), the transaction data of the depositor can be identified beyond doubt. To do this, a comparison is made of the physically present forged note with the image of said note stored in the automated teller machine. To do this, the physically present forged note is inserted into the automated teller machine, followed by a comparison procedure in which the complete image of the forged bank note inserted is compared with the stored images of the bank notes saved at the time of deposit for agreement. If agreement was detected during the image comparison, the transaction data associated with the stored image of the bank note are provided so that the corresponding account link can be output and the depositor identified. The disadvantage of the known device is that it is always necessary to insert the physically present forged bank note into the automated teller machine for the comparison procedure. The reason is that this bank note is required later at another location as evidence or similar.

For this reason, a simplified device for tracing bank notes is known from U.S. Pat. No. 6,783,061 in accordance with which the transaction data of the depositor who inserted a forged bank note into an automated teller machine are identified by a comparison of serial numbers of the bank notes. To this end, after the depositor has inserted the bank note into a deposit device of the automated teller machine, the authenticity of the bank note is checked by a bank note checking device and if the inauthenticity of said bank note is ascertained, a serial number is generated as text by means of an optical character recognition device from the image data of the bank note. The series of alphanumeric characters generated by text recognition (OCR) is filed together with the transaction data assigned to said series in a data memory. If it has been established by means of the bank note checking device that a bank note is forged, authorized persons can determine later by means of a bank note inspection program which transaction data, or which depositor, can be assigned to the physically present forged bank note. For this purpose, the serial number on the physically present bank note is compared with the serial numbers stored as text in the data memory of the automated teller machine. If agreement is established, the transaction data of the matching serial numbers lead to the identity of the depositor of the forged bank note. The disadvantage of the known method for tracing bank notes, however, is that, in the event of at least partial damage or if the serial number of the forged bank note is unrecognizable, no complete serial number can be extracted. If, for example, the bank note is torn at the edge, where a tear extends through one character of the serial number, the complete serial number cannot be generated by character recognition. A comparison of serial numbers cannot be successful.

SUMMARY OF THE INVENTION

An object of the present invention is, therefore, to cite a method and a device for tracing bank notes such that a depositor of a forged bank note can be reliably identified even if the serial number of the bank note is not recognizable in its entirety.

In order to accomplish this object, the method under the invention is characterized in that a serial number image of the bank notes is additionally detected that forms an image detail of the bank note in an area of the bank note intended for the serial number, in that the serial number detected is stored with the serial number and the transaction data, and in that a comparison of the serial number images with the forged bank note is conducted if the serial number of the forged bank note has not been completely identified and/or if a comparison of the serial number of the forged bank note does not provide any agreement with the at least one stored serial number.

In accordance with the invention, a serial number image of the bank notes at the time of deposit is generated in addition to the serial number in text form and stored together with the respective transaction data. In this way, the transaction data for those forged bank notes that have been damaged, soiled and/or manipulated in the area of the serial number can be identified with certainty. If, for example, the forged bank note has a tear that makes a character of the serial number unrecognizable, an agreement can be established with a high degree of certainty by comparing the stored serial number image with the physically present bank note. Using this method, the depositor of a forged bank note can advantageously be identified with absolute certainty.

In accordance with a further embodiment of the method from the invention, only the serial numbers as text and serial number images are generated of those bank notes that have been identified as suspect. The volume of data to be stored can advantageously be limited in this way.

In accordance with a preferred embodiment of the method from the invention, the comparison of serial numbers is carried out in two steps. In a first comparison step, the serial number of the physically present forged bank note is compared with the serial numbers stored as text. If an agreement is established, the comparison process is concluded. If no agreement is established, a second comparison step is performed in which the serial number of the physically present forged bank note is compared with the stored serial number images. Preferably only those serial number images are taken for comparison that correspond to incompletely detected serial numbers in text form. The number of serial number images taken to the second comparison step is thus smaller than the number of available serial number images. In this way, the comparison as a whole can be simplified or speeded up.

In accordance with a preferred embodiment of the invention, the comparison between the serial number images displayed and the serial number of the physically present forged banknote is undertaken visually by an authorized person. The agreement between the physically present forged bank note and a complete serial number field of the stored forged bank note can advantageously be checked directly. Criteria for the agreement are, first, the number sequence existing as an image and, second, identifying marks detectable through an image, such as a tear, later writing or similar. The degree of certainty in the agreement is relatively high as a result.

To accomplish the object, the device in accordance with the invention is characterized in that an image detail device, by means of which a serial number image can be generated that forms an image detail of the bank note in an area intended for the location of the serial number of said bank note, in that the control device is configured in such a way that the serial number image of the bank note can be stored in the data memory and assigned to the transaction data and the serial number as text of said bank note, and in that the effect of the bank note checking program on a display device is such that the serial number image of the aforementioned forged bank note is displayed for a comparison of said image with the serial number located on the forged bank note.

In accordance with the invention, by generating a serial number image as an image detail of the bank note in an area containing the serial number of said bank note, a comparison based on a serial number image is made between the physically present forged bank note on the one hand, and of data available for forged banknotes at the time of deposit and serial number image data of forged bank notes on the other hand. In this manner, the depositor of the forged bank note can be identified with great certainty. A "serial number comparison" can be advantageously carried out even if the image data of the serial numbers are not available in their entirety. Identifiers in the field of the bank note provided for the serial number recorded as images act as additional identifiers, which can then advantageously be checked in addition for agreement. This check is preferably conducted visually by an authorized person who does not have to insert the physically available forged bank note into a slot of the automated teller machine. The serial number image can be displayed by a display unit of the automated teller machine or a computing unit connected to said automated teller machine, so that by means of preferably direct comparison with the forged bank note agreement can be established through the features identifying the banknote.

In accordance with a preferred embodiment of the invention, an image detail unit to generate the serial number image has an image scanner, the image data from which can be stored in the form of a raster graphic or a vector graphic in a data memory. This serial data image contains, besides the legible alphanumeric characters of the serial number, additional identifying features for the bank note present in the serial number field in image form. Through character recognition, the serial number can advantageously be generated as text from the image data of the serial number field; the serial number is intended to lead to identification of the depositor of the forged bank note in a first comparison step.

The serial number comparison preferably takes place directly at the automated teller machine at which the deposit of the forged bank note has been ascertained. For this purpose, the automated teller machine has the devices necessary for the identification, that is to say a deposit device, a bank note checking device, a control unit with a data memory and an optical character recognition device, image detail device, and display device. A suitable bank note checking program may be implemented in a program code of the control unit of the automated teller machine.

BRIEF DESCRIPTION OF THE DRAWINGS

One embodiment of the invention is explained in greater detail hereinafter using the Figures.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Figure 1:
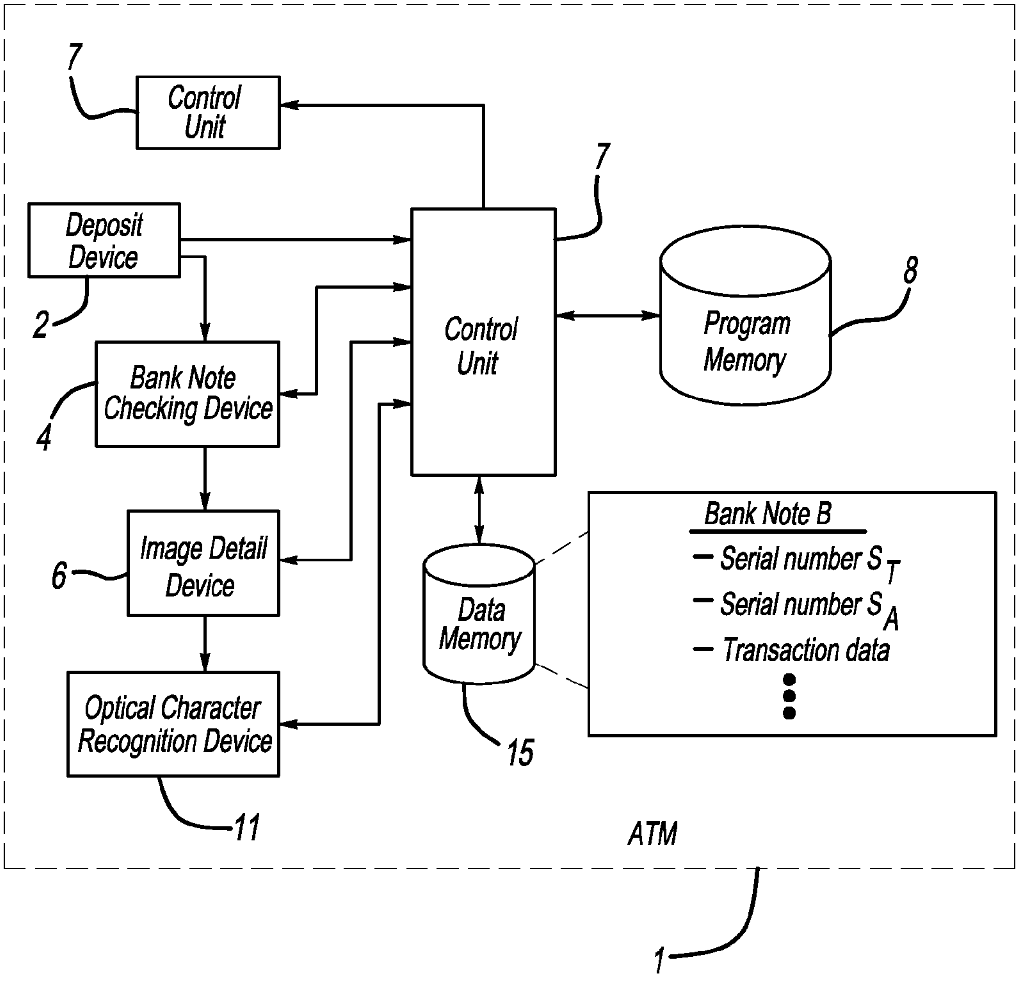
FIG. 1 shows a block diagram of an inventive device for tracing bank notes.

Example embodiments will now be described more fully with reference to the accompanying drawings.

A device in accordance with the invention for tracing bank notes essentially comprises an automated teller machine 1, which has not only a dispensing function but also a deposit function. The automated teller machine 1 has a deposit device 2 for this purpose by means of which a user (depositor) can insert bank notes B into the automated teller machine 1 and, after a checking procedure is complete, can credit the corresponding total of the bank notes B to his bank account. The automated teller machine 1 usually has a display unit 3, configured as a monitor, which provides the user with instructions and information for the deposit process.

The automated teller machine 1 further has a bank note checking device 4 that checks the bank notes inserted B for authenticity. If the bank notes B are detected as genuine, they are taken to an appropriate storage bin of the automated teller machine 1 and the corresponding sum of money is credited to the bank account matching the one given by the depositor. The bank note checking device 4 has means so that authenticity features of the bank notes B, such as guilloches 5 or security threads, etc., can be checked. If one or more of the aforementioned authenticity features cannot be detected in the bank note B, it is considered suspect or forged so that it is taken to an image detail device 6.

This image detail device 6 is activated in the same manner as the bank note checking device 4 by a control unit 7 of the automated teller machine 1, running a bank note checking program stored in a program memory 8. The image detail device 6 includes a scanner that is directed at the inserted banknote B in such a way that only one serial number image $S_A$ in a serial number field 9 (in image form) is detected for the bank note B.

Figure 2A:
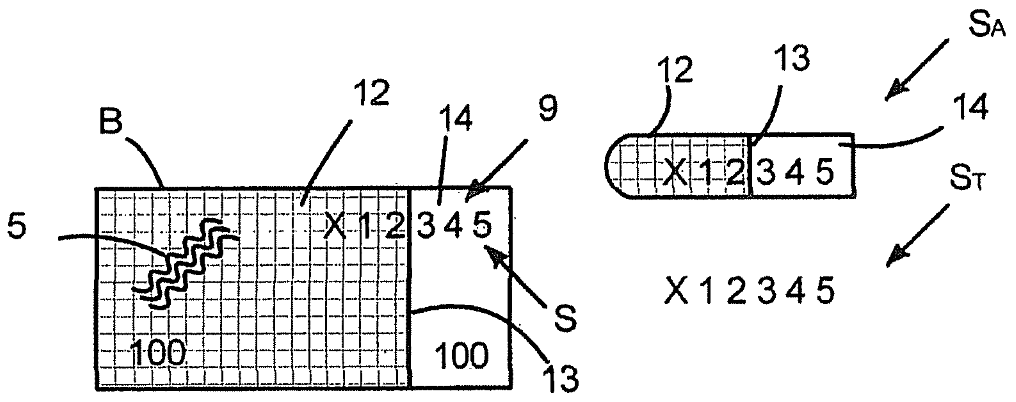
FIG. 2*a* shows a schematic plan view of a bank note having a complete serial number.
Figure 2B:
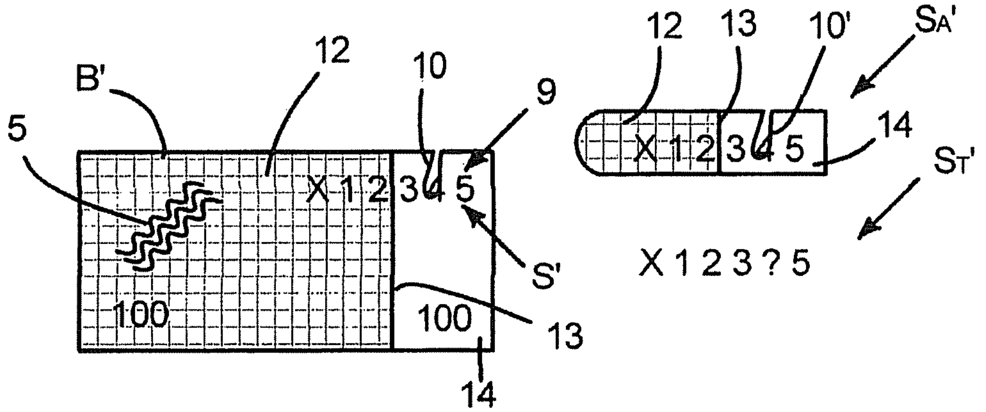
FIG. 2*b* shows a schematic plan view of a bank note with a damaged serial number.

In addition, an optical character recognition device 11 is assigned to the image detail device 6 that recognizes the serial number $S_T$ by text recognition from the image data provided by the image detail device 6 via the serial number field 9. It can be seen from FIGS. 2*a* and 2*b* which results the image detail device 6 and the optical character recognition device 11 yield, depending on the condition of the serial number field 9. If this is a bank note B with an undamaged or unsoiled serial number field 9, the serial number $S_T$ can be generated with the complete alphanumeric sequence of characters for the serial number S. However, if it is a damaged bank note B' that has a tear 10 in the serial number field 9 in the area of the character "4" of serial number S', as shown in FIG. 2*b*, a serial number $S_T'$ is generated using the text recognition program that has a "?" symbol in the position at which the damaged character appears. The serial number in text form $S_T'$ thus does not reproduce completely the actual serial number S' of the deposited bank note B'.

Using the image detail device 6, the serial number image $S_A$ is generated in the case of the undamaged bank note B that contains, besides the imaged representation of the serial number S, additional image features (identifying features) surrounding the characters of the serial number. In this case, it may be, for example, a graphic pattern 12 that on bank note B is separated by a perpendicular line 13 from a white field 14 on which the value "100" for bank note B is shown in numerals at the bottom. If the same bank note B' has a tear 10, however, corresponding image tear data 10' are generated that conceal the numeral "4" of the serial number.

If bank note B, B' is detected as forged or is suspected of being forged by the bank note checking device 4, first, the serial numbers $S_T$, $S_T'$ and, second, the serial number images $S_A$, $S_A'$ are stored in a data memory 15 together with the transaction data assigned to this bank note B, B'. The serial numbers $S_T$, $S_T'$ are stored as text, the serial number images $S_A$, $S_A'$ are stored in the form of a raster graphic or a vector graphic as image data. In addition, the bank note B, B' detected as being forged is deposited in a storage bin especially provided for forged bank notes.

In accordance with an alternative embodiment not shown, the scanner of the image detail device 6 can also detect the entire image of bank note B, B', in which the serial number field 9 is filtered out as an image detail.

Figure 3:
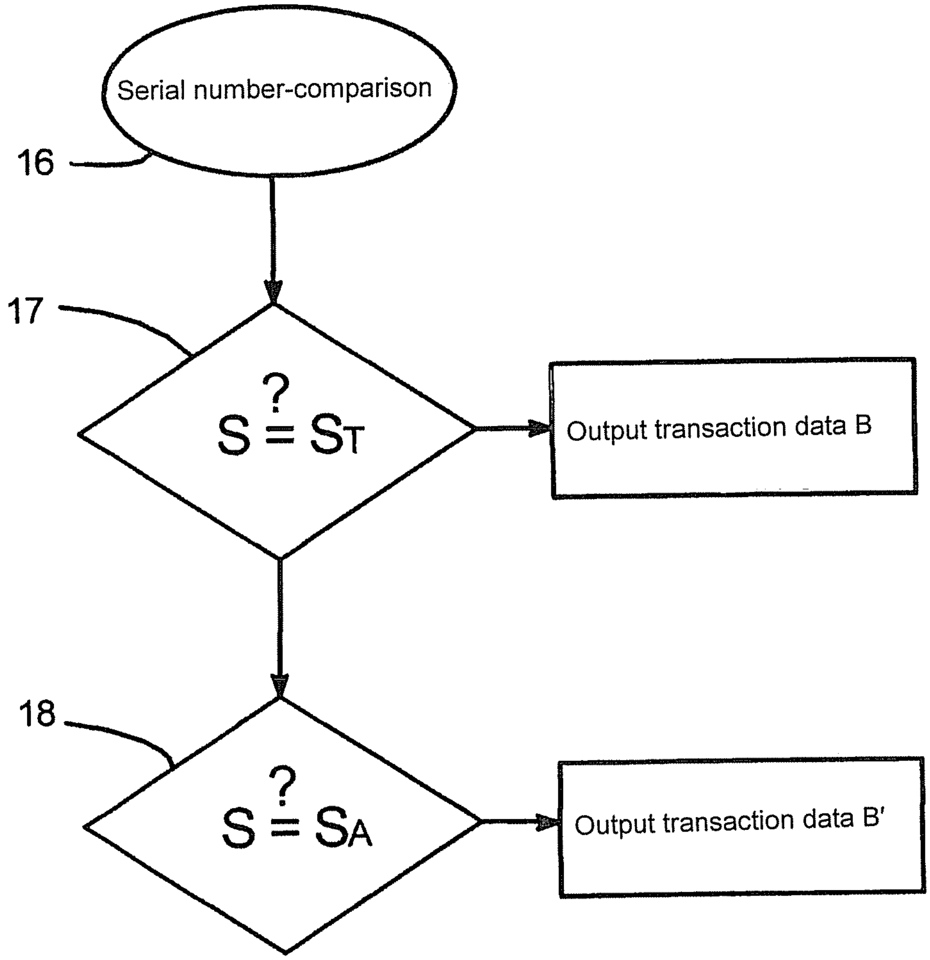
FIG. 3 shows a flow chart for a serial number comparison.

The bank note B, B' detected as forged or suspected of being forged is then taken to an external inspection location, for example a central state bank or the Federal Bank for a second authenticity check. If the external inspection location determines that the bank note B, B' must be regarded as in fact forged, the identity of the depositor of the forged bank note B, B' must be established by returning the bank note B, B' to the automated teller machine 1 and through a subsequent serial number comparison 16. For this, the transaction data that were filed in the data memory 15 along with the serial number $S_T$, $S_T'$ and the serial number image $S_A$, $S_A'$ must be identified. As can be seen from FIG. 3, a check is made in a first comparison step 17, preferably by an authorized person, whether the serial number S of physically present forged bank note B agrees with the stored serial number $S_T$ in text form. If, in the case of the forged bank note, it is the bank note B shown in FIG. 2*a* on which the serial number field 9 is undamaged, this comparison step 17 already results in a successful agreement. The alphanumeric character sequence "X12345" of the serial number $S_T$ agrees with the serial number S of the forged bank note B. The matching transaction data can then be shown via the display device 3 so that the depositor of the forged bank note can be identified.

If, in the case of the forged bank note, it is the bank note B' shown in FIG. 2*b* with the tear 10, the first comparison step 17 is unsuccessful. The serial number $S_T'$ shown has the symbol "?" at the location with the tear 10 because the numeral "4" is illegible. Thus, no agreement between the physically present bank note B' and one of the stored serial numbers $S_T'$ can be established although in fact the serial number $S_T'$ is assigned the transaction data of the forged bank note B'.

Therefore, a second comparison step 18 must be carried out in which a comparison of the serial number S of the physically present bank note B' with the serial number image $S_A'$ stored in the data memory 15 is undertaken. One of the things shown in the display device 3 is the serial number image $S_A'$ that contains erroneous data that correspond to the actual appearance in serial number field 9 of the forged bank note B'. In particular, first, the recognizable character sequence of the serial number image $S_A'$ and, second, the identifying image feature of the tear 10 agree with the corresponding characters in serial number field 9 of the physically present bank note B'. Thus, the agreement of the serial numbers S' and $S_A'$ can be established so that by outputting the transaction data matching the serial number image $S_A'$ the depositor of the forged bank note B' can be identified0o.

Both the comparison of the serial number S, S' on the physically present bank note B, B' with the serial number $S_T$, $S_T'$ as text and the comparison of the serial number S, S' with the serial number images $S_A$, $S_A'$ is made visually by the authorized person, when the authorized person holds the bank note B, B' in his hand, while the serial number $S_T$, $S_T'$, or $S_A$, $S_A'$, are shown on the screen of the display device 4. Serial number comparison 16 is thus completed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method for tracing bank notes, wherein bank notes are inserted into an automated teller machine (ATM) with deposit function and checked for authenticity, wherein a serial number of the bank note is detected and stored as text together with transaction data only if the banknote is suspected of being forged, comprising wherein:

a serial number image for the bank notes is additionally detected that forms an image detail of the bank note in an area intended for the serial number of the bank note, only if the bank note is suspected of being forged;

the serial number image detected is stored with the serial number and the transaction data;

a comparison between the serial number of a banknote retrieved from the ATM that is suspected of being forged and the serial number stored as text is performed to determine if the bank note retrieved from the ATM is the same bank note from which serial number text was detected and obtained; and a comparison of the serial number image with the bank note retrieved from the ATM suspected of being forged is conducted if the serial number has not been completely identified based on the stored text of the serial number to determine if the bank note retrieved from the ATM is the same bank note from which the serial number image was detected and obtained.

2. The method according to claim 1, wherein in the event of an agreement in the comparison between the serial number image and the serial number of the forged bank note the transaction data assigned to the forged bank note are provided.

3. The method according to claim 1, wherein the serial number and the serial number image of only those bank notes are stored which have been determined to be forged bank notes as part of the authenticity check.

4. The method according to claim 1, wherein in a first comparison step the serial number of the forged bank notes is compared with the serial number stored as text and wherein a second comparison step, in which the serial number of the forged bank note is compared with the at least one stored serial number image, and wherein the second comparison step, in which the serial number of the forged bank note is compared with the at least one stored serial number image, only takes place if the first comparison step has not yielded any agreement.

5. The method according to claim 1, wherein the comparison between the serial number image shown by a display device and the serial number located on the physically present forged bank note is undertaken visually by an authorized person.

6. The method according to claim 1, wherein the method is performed at least in part by a control unit including.

7. A device for tracing bank notes comprising:

a deposit device by means of which bank notes can be inserted into the automated teller machine, a bank note checking device by means of which the inserted bank notes can be checked for authenticity, an optical character recognition device by means of which a serial number for the bank note can be generated from image data of said bank note, only if said bank note is suspected of being forged, a control device having a bank note checking program by means of which first the serial number of the respective bank notes can be stored in a data memory assigning said serial number to transaction data of the same bank note and by means of which second the serial number of a bank note detected as forged can be checked with the serial numbers stored in the data memory as text, an image detail device by means of which a serial number image can be generated that forms an image detail of the bank note in an area of said bank note intended for the location of the serial number, only if said bank note is suspected of being forged, wherein the control device is configured such that the serial number image of the bank note can be stored in the data memory, being assigned to the transaction data and the serial number in text form of the same bank note, wherein the effect of the bank note checking program on a display device is such that the serial number image of the aforementioned forged bank note is displayed for a comparison of said image with the serial number located on the forged bank note retrieved from the deposit device to determine if the forged bank note retrieved from the deposit device is the same bank note processed by the optical character recognition device, and wherein the serial number image is shown on the display device such that a visual comparison can be performed by an authorized person between the serial number image displayed and the serial number on the physically present forged bank note retrieved from the deposit device when the serial number stored by the optical character recognition device is incomplete in order to determine if the forged bank note retrieved from the device is the same bank note imaged by the image detail device.

8. The device according to claim 7, wherein the image detail device includes a scanner that generates the scanner image of the bank note and/or of the area of the bank note containing the serial number in the form of a raster graphic or in the form of a vector graphic, wherein the image data include the detected characters of the serial number and additional features identifying the bank note.

9. The device according to claim 7, wherein the deposit device, the bank note checking device, the control device with the data memory, the optical character recognition device, the image detail device, and the display device are integrated into an automated teller machine with deposit function.

10. A method for tracing bank notes comprising:

receiving a bank note deposited in an automated teller machine;

storing transaction data related to depositing of the bank note;

checking the bank note for authenticity;

capturing image data from the bank note only if the bank note is suspected of being non-authentic, the image data including a serial number of the bank note;

capturing text data of the serial number from the bank note only if the bank note is suspected of being non-authentic;

retrieving the bank note from the automated teller machine if the bank note is suspected of being non-authentic, visually and manually reading the serial number on the retrieved bank note and comparing the serial number to the text data to identify the retrieved bank note as the imaged bank note suspected of being non-authentic;

if the text data is incomplete, comparing the retrieved bank note with the image data to identify the retrieved bank note as the imaged bank note suspected of being non-authentic; and associating the retrieved bank note with the transaction data to identify the depositor of the retrieved bank note.

11. The method of claim 10, wherein comparing the bank note with the image data includes comparing physical identifying marks of the bank note.

12. The method of claim 10, wherein comparing the bank note with the image data includes comparing physical identifying marks of the bank note including physical damage to the bank note.

13. The method of claim 10, wherein comparing the bank note with the image data includes comparing physical identifying marks of the bank note including a tear in the bank note.

14. The method of claim 10, wherein comparing the bank note with the image data includes comparing writing on the bank note.

15. The method of claim 10, wherein comparing the bank note is performed without inserting the bank note back into the automated teller machine.

16. The method of claim 10, wherein comparing the bank note is performed after the bank note has been withdrawn from the automated teller machine.

17. The method of claim 10, wherein comparing the bank note with the image data includes viewing the image data on a display of the automated teller machine.

* * * * *